United States Patent
Fjalestad et al.

(10) Patent No.: US 11,428,560 B2
(45) Date of Patent: Aug. 30, 2022

(54) ESTIMATING FLOW RATE AT A PUMP

(71) Applicant: STATOIL PETROLEUM AS, Stavanger (NO)

(72) Inventors: Kjetil Fjalestad, Skien (NO); Dinesh Krishnamoorthy, Porsgrunn (NO)

(73) Assignee: EQUINOR ENERGY AS, Stavanger (NO)

( * ) Notice: Subject to any disclaimer, the term of this patent is extended or adjusted under 35 U.S.C. 154(b) by 296 days.

(21) Appl. No.: 15/765,381

(22) PCT Filed: Oct. 5, 2016

(86) PCT No.: PCT/NO2016/050200
§ 371 (c)(1),
(2) Date: Apr. 2, 2018

(87) PCT Pub. No.: WO2017/061873
PCT Pub. Date: Apr. 13, 2017

(65) Prior Publication Data
US 2018/0252566 A1    Sep. 6, 2018

(30) Foreign Application Priority Data

Oct. 5, 2015   (GB) .................................... 1517537

(51) Int. Cl.
*G01F 1/88* (2006.01)
*G01F 1/74* (2006.01)
(Continued)

(52) U.S. Cl.
CPC .............. *G01F 1/88* (2013.01); *F04D 13/10* (2013.01); *F04D 15/0088* (2013.01); *G01F 1/34* (2013.01);
(Continued)

(58) Field of Classification Search
CPC ..................................... G01F 1/88; G01F 1/34
See application file for complete search history.

(56) References Cited

U.S. PATENT DOCUMENTS 5,353,646 A * 10/1994 Kolpak ..................... G01F 1/74
73/861.04
5,400,657 A  3/1995 Kolpak et al.
(Continued)

FOREIGN PATENT DOCUMENTS

| CN | 104632643 | 5/2015 |
| KR | 10-2011-0138819 | 12/2011 |
| WO | 2005/035943 | 4/2005 |

OTHER PUBLICATIONS

A.E Cattaert, High Pressure Pump Efficiency Determination from Temperature and Pressure Measurements, IEEE PES PowerAfrica 2007 Conference and Exposition Johannesburg, South Africa, Jul. 16-20, 2007 (Year: 2007).*
(Continued)

*Primary Examiner* — Matthew G Marini
(74) *Attorney, Agent, or Firm* — Wenderoth, Lind & Ponack, L.L.P.

(57) ABSTRACT

A method for determining an estimated flow rate of fluid flow in a pump comprises: obtaining measurements of the pressure and temperature of fluid at the intake to the pump, the pressure and temperature of the fluid at the discharge from the pump, and the electrical power supplied to the pump; determining values representing either the density of the fluid and the specific heat capacity of the fluid, or the specific fluid enthalpy based on measurements and/or historical data; and calculating an estimated efficiency of the pump and an estimated flow rate of the fluid based on the measured electrical power, the measured temperatures, the measured pressures, the determined value for density and the
(Continued)

determined value for specific heat capacity or the determined value for specific fluid enthalpy.

19 Claims, 8 Drawing Sheets

(51) Int. Cl.
    *G01F 1/34*     (2006.01)
    *G01F 1/86*     (2006.01)
    *F04D 13/10*     (2006.01)
    *F04D 15/00*     (2006.01)
    *G01F 15/02*     (2006.01)
    *G01F 25/10*     (2022.01)

(52) U.S. Cl.
    CPC ............... *G01F 1/74* (2013.01); *G01F 1/86* (2013.01); *G01F 15/02* (2013.01); *G01F 25/10* (2022.01); *F05B 2270/20* (2013.01); *F05B 2270/301* (2013.01); *F05B 2270/303* (2013.01)

(56) References Cited

U.S. PATENT DOCUMENTS

| | | | | |
|---|---|---|---|---|
| 7,328,624 | B2 * | 2/2008 | Gysling | G01F 1/666 73/152.18 |
| 7,398,184 | B1 * | 7/2008 | Chen | G06Q 40/06 702/182 |
| 8,915,145 | B1 * | 12/2014 | Van Orsdol | G01F 1/74 73/861.04 |
| 10,041,842 | B2 | 8/2018 | Sheelavant | |
| 2003/0035730 | A1 * | 2/2003 | Schob | A61M 1/101 417/53 |
| 2008/0257067 | A1 | 10/2008 | Henty et al. | |
| 2008/0262736 | A1 | 10/2008 | Thigpen et al. | |
| 2008/0306892 | A1 | 12/2008 | Crossley et al. | |
| 2010/0228502 | A1 | 9/2010 | Atherton | |
| 2011/0088484 | A1 | 4/2011 | Camilleri | |
| 2011/0137580 | A1 | 6/2011 | Bartels et al. | |
| 2013/0317762 | A1 | 11/2013 | Camilleri | |
| 2015/0211906 | A1 | 7/2015 | Skovmose Kallesøe | |

OTHER PUBLICATIONS

Brenne, Lars; Bjorge, Tor; Gilarranz, Jose L.; Koch, Jay M.; Miller, Harry F. (2005). Performance Evaluation Of A Centrifugal Compressor Operating Under Wet Gas Conditions.. Texas A&M University. Turbomachinery Laboratories. (Year: 2005).*

Search Report dated Feb. 7, 2020 in corresponding Norwegian Patent Application No. 20180572 with English-language translation.

International Search Report and Written Opinion of the International Searching Authority dated Dec. 14, 2016 in International (PCT) Application No. PCT/NO2016/050200.

Search Report dated Mar. 31, 2016 in corresponding GB Application No. GB1517537.5.

Norwegian Search Report dated Oct. 15, 2020 in corresponding Norwegian Patent Application No. 20180572.

Russian Search Report dated Feb. 10, 2020 in corresponding Russian Patent Application No. 2018116575/28(025811).

\* cited by examiner

ESTIMATING FLOW RATE AT A PUMP

The invention relates to a method and an apparatus for estimating the flow rate of fluid flow in a pump, such as a centrifugal pump for multi-phase flows such as oil and gas flows. The invention may be used to assess flow rate for various fluids, advantageously including fluids with varying viscosity or fluid components/phase fractions.

It is beneficial to be able to determine the flow rate of fluids in any fluid processing and/or transportation system. For example, in the oil industry it is important to measure the flow rates of fluids produced by oil and gas wells. Various pumps are used in conveying fluids for fluid processing and/or transportation systems such as oil well systems, and the flow rates through the various pumps can be important to know, but hard to determine especially when there is a multiphase fluid, and compressible fluid phase fractions, and/or a fluid with one or more properties that are hard to determine.

There are various examples in the prior art relating to determining flow rates based on pump parameters and making use of the ability to measure the electrical power supplied to the pump in order to derive information relating to the pump operating conditions, even when the pump is in a remote and inaccessible location. For example, US 2013/317762 discloses a method of determining flow rates for a well equipped with an electric submersible pump (ESP). Electrical power is applied to an ESP and controlled with surface switchgear. A processor receives intake and discharge pressures from either a single gauge or two gauges installed in the well. The processor receives a voltage and a current. The processor further receives at least one static value. The processor calculates an efficiency to flow rate ratio by applying the received voltage and current to a power equilibrium equation. The processor obtains a non-dimensional flow rate by applying the calculated efficiency to flow rate ratio to the static data. The processor calculates the flow rate from the non-dimensional flow rate. The processor creates a log of calculated flow rates.

US 2015/211906 discloses another method for detecting the flow rate of a centrifugal pump such as an ESP. The method involves determining the rotation speed of the pump or of the motor driving the pump, a hydraulic variable of the pump, typically the delivery pressure and an electrical variable of the drive motor, for example the electrical power. The flow rate is evaluated by way of these variables. For this, variables dependent on the flow rate are determined by way of a mathematical linking of terms of equations describing physical relations of the pump and drive motor, wherein one term contains the rotation speed of the pump and a hydraulic variable of the pump and another term contains an electrical or mechanical variable of the drive motor of the pump and the rotation speed of the pump. The flow rate is determined by way of the functional relation between the flow rate and the dependent variable.

Such techniques are often referenced as 'soft sensors' for the flow rate. They provide an estimate of the flow rate rather than a measurement as such. Other technologies used for similar flow rate measurements include multiphase flow meters (MPFMs). However, there is still a need for improved techniques for the estimation of flow rate for pumps such as ESPs and for other pumps, especially for the pumping of multiphase fluids and compressible fluids. Currently available wellhead instruments such as MPFMs are expensive and require extensive calibration, and currently do not provide acceptable accuracy for viscous flows such as heavy oils. The existing ESP 'soft sensors' also require extensive calibration and are strongly dependent on fluid viscosity. In addition, repeated calibration is required over time as the pump is used and its operating characteristics change due to wear and tear. Variations in fluid viscosity generate particular challenges in multiphase fluids such as oilfield production fluids since the viscosity can vary considerably within a short time period and it cannot easily be modelled or measured in real-time. The prior art hence has significant difficulties in dealing with varying viscosity.

Viewed from a first aspect the present invention provides a method for determining an estimated flow rate of fluid flow in a pump, the method comprising: obtaining measurements of the pressure and temperature of fluid at the intake to the pump, the pressure and temperature of the fluid at the discharge from the pump, and the electrical power supplied to the pump; determining values representing either the density of the fluid and the specific heat capacity of the fluid, and/or the specific fluid enthalpy based on measurements and/or historical data; and calculating an estimated efficiency of the pump and an estimated flow rate of the fluid based on the measured electrical power, the measured temperatures, the measured pressures, the determined value for density and the determined value for specific heat capacity or the determined value for specific fluid enthalpy.

In contrast to known methods a measurement of temperature at both intake and discharge is included in combination with determination of density and specific heat capacity, or of the specific fluid enthalpy. The result of this is that it is possible to determine the flow rate even when the fluid is a viscous fluid and/or when the viscosity varies. The method makes use of values for either density and specific heat capacity together, or just specific fluid enthalpy, or all of density, specific heat capacity and specific fluid enthalpy. Where specific fluid enthalpy is known or can be determined then the method above can also be used when the fluid is compressible. In addition, where the pump has a known cross-sectional area at inlet and discharge then even if specific fluid enthalpy values are not available or not used, so that density and specific heat capacity must be used instead, then the method can be used when the fluid is compressible, with the cross-sectional area being taken into account during the calculation of pump efficiency and estimated flow rate. Thus it enables accurate estimation of flow rate through the pump even in the case of multiphase fluids with varying viscosity, such as production fluids from an oil and gas well including water as well as even heavy oils. The prior art does not have this capability. The proposed method can be used with any pump where the required pressure and temperature measurements can be obtained, and where the power supplied to the pump can be determined. There is no requirement for extensive calibration, even when the pump performance changes due to wear of the pump. However, if calibration is available then advantageously the method can be extended to also make use of the calibration data and to determine the fluid viscosity, providing a further advantage compared to the prior art ESP systems mentioned above.

The invention is, in part, based on a realisation that although the viscosity cannot be measured or assigned an accurate estimated value, it is possible to determine suitably accurate values for the density and the specific heat capacity of the fluid and/or for the specific fluid enthalpy. In most typical scenarios these parameters are constant over relatively long periods of time, unlike the density which varies quickly and unpredictably. There is hence no requirement for an instantaneous measure of density, specific heat capacity, or fluid enthalpy. Instead a measurement can be obtained over a longer period of time, for example by using a slower measurement technique, or a measurement can be taken of fluids that have already passed through the pump, with this 'historical' measurement being used to give a suitable value for density and for specific heat capacity. Thus, in some example implementations the fluid passing through the pump can be periodically sampled or collected downstream of the pump, with measurements being taken using known techniques, and these measurements can be used in the present method as suitably accurate values for density and specific heat capacity and/or specific fluid enthalpy. Such periodic measurements may for example be taken hourly, daily, weekly, or monthly depending on the particular situation. Alternatively, estimated values for fluid density, specific heat capacity and/or specific fluid enthalpy can be used. These may be derived from fluid property models and from the pressures and temperatures that are measured at the pump intake and discharge.

The measured temperatures and pressures may be obtained from conventional sensors in place at the inlet and discharge of the pump. It is already known in the art to use such sensors for monitoring purposes and for process control. The method may include providing temperature and pressure sensors if necessary. In particular, the method may include providing a sensor for the discharge temperature in the case where an existing pump has inlet and discharge pressure sensors, and an inlet temperature sensor, which is a typical arrangement. It is an advantage of the invention that often only this single additional temperature sensor will be required to adapt an existing pump for use with the method, or indeed in some cases there may be no additional sensors needed. Another advantage is that the method can be used in the case of a submersible pump (ESP) where the motor is also inside the well pipe regardless of the location of the temperature sensor at the intake sensor relative to the motor. This, the sensor may be upstream or downstream the motor. If the sensor is downstream of the motor then the motor efficiency should be included when calculating the power supplied to the pump.

In order for the method to be most accurate it is preferred to avoid measurements taken during periods of transition or unstable flow, for example after significant changes are made to the control of the pump and/or to other flow control devices upstream or downstream of the pump that affect the flow conditions at the pump. Such other flow control devices might include valves, pumps and so on. Transition or unstable flow can also result from outside sources, such as changes in downhole in an oil and gas installation resulting from natural variations or geological formations. The method therefore may include a step of determining if a stable flow condition exists, for example by allowing a predetermined time period to elapse after the system is initiated or after an unstable flow condition is known to be present or has been detected. In some examples this may include allowing a predetermined time period to elapse after a change is made to the control of the pump or to other flow control devices affecting the flow at the pump. The predetermined time period may be 5 minutes or 10 minutes, for example. Alternatively or in addition, the method may include checking for changes above a certain threshold in one or more of the measured pressures, the measured temperatures, the power supplied to the pump system or the calculated pump efficiency during that time period. If there is a change in excess of the threshold then it is deemed that flow is unstable, and hence more time is allowed to elapse to check for a stable condition. Typically the threshold would be for changes higher than 1-5% of the measured difference (e.g. the variation should be less than ±0.1° C. if the temperature increase from intake to discharge is 2° C.) although the threshold will be system dependent. For some cases a dynamic model (differential equations) could compensate for the transients and an observer (e.g. a Kalman filter) could be applied to provide valid flow rate estimated even during transient periods.

Preferably, the method further includes comparing the estimated efficiency of the pump to the manufacturer's efficiency values. This provides a check to ensure that there are no faults in the system and that there are no outside influences resulting in the method becoming inaccurate or ineffective. For example, a sensor fault due to physical (e.g. clogging) or electrical problems can result in a bad reading, which would not provide accurate results. An unstable flow condition, such as unstable flow as discussed above, will also give inaccurate estimation of the flow rate. There could also be an unexpected and quick change in density or specific heat capacity if the fluid composition changes suddenly, for example due to unexpected large increase in water cut in an oil and gas production fluid. Comparing the calculated efficiency from the current method against the expected efficiency for the pump provides a means of checking the input data and hence identifying any potential bad values.

Additional checks may also be included. For example, the discharge and intake temperatures may be compared to check that the discharge temperature is higher than or at least the same as the intake temperature. A discharge temperature that is lower than the intake temperature would tend to indicate zero flow or reverse flow, or some other problem.

The cross-sectional area of the pump will of course typically be a known quantity based on the pump specification. In general the cross-sectional area of the inlet and the discharge will be identical.

The electrical power supplied to the pump may be measured in any suitable way. This electrical power may be power supplied directly to the pump to a motor that is integral to the pump, or electrical power supplied to a motor outside of the pump, where this motor powers the pump via a mechanical coupling. In some example embodiments the method involves measurement of current and voltage supplied to the pump (which may be supplied either directly or via a separate motor). Advantageously, this can be done remotely from the pump, with an adjustment being made to take account of losses in the conductors between the measurement point and the pump motor.

The step of calculating an estimated flow rate may be carried out using any suitable formulae relating the measured and estimated values. One preferred implementation is based on the assumption that the power supplied to the pump is converted to mechanical energy and to heat in the pumped fluid, and that there is no loss of either mass (i.e. no leakage) or of heat (i.e. all the waste heat is taken by the fluid). This would be applicable to ESPs and other downhole systems, as well as other systems were the heat leak is negligible. For where there is a non-negligible heat loss then the heat loss may be calculated/estimated with this being included in the calculation. Mass and energy balances may be used to determine the flow rate based on the measured pressure and temperature values, the known cross-sectional area for the pump, and the determined values for density and specific heat capacity or specific fluid enthalpy. Suitable mass and energy balances are set out below by way of example as equations (1) and (2). The method may make use of these equations, or mathematical equivalents thereof.

It will be appreciated that various models may be used to determine a mass flow rate for the fluid based on the input parameters used for the present method. One example is set out in equations (3) to (9) below, making use of density and specific heat capacity. Another possibility is to use fluid enthalpy, as show in equations (44 to 47). The method may make use of these equations and further may include one or more of equations (12) to (32), or combinations thereof as appropriate in order to obtain one or more of the mass flow rate, volume flow rate or pump efficiency. Mathematical equivalents of these equations may also be used. The method may include alternative solutions for use with incompressible fluids (or fluids that can be approximated as incompressible) and for compressible fluids. In the case of compressible fluids then a non-linear method may be used to solve the equations.

Optionally, the method may include using calibration data for the pump to determine a viscosity for the mixed fluid based on the estimated flow rate and on the estimated pump efficiency. Where a viscous fluid is present then this step may include the use of viscosity correction factors, for example as defined in equations (33) to (38) below. Additionally, when a compressible fluid is present, then the method may include the use of gas correction factor functions to estimate the gas volume fraction or the gas mass fraction inside the pump for example as defined in equations (39) to (43).

The pump may be a centrifugal pump. The approach described above has been found to provide accurate results for this type of pump. The pump may for example be an electrical submersible pump (ESP).

Preferably the method is used to estimate flow rates for multiphase fluids, for example in the oil and gas industry. Thus, the pump may be a pump in an oil and gas installation. The fluid may be a multiphase production fluid from an oil well, such as a mixture of oil, water and/or gas. The method has been found to provide particular advantages over prior art methods when the fluid includes viscous components such as heavy oils. Thus, in some examples the fluid includes heavy oils.

In a further aspect the invention provides a computer programme product comprising instructions that, when executed, will configure a data processing device to carry out the method described above in the first aspect and the preferred/optional features thereof. Thus, there may be a computer programme product comprising instructions that, when executed, will configure a data processing device to receive measurements of pressure and temperature of fluid at an intake to a pump, pressure and temperature of the fluid at a discharge from the pump, and electrical power supplied to the pump; to receive or to determine values representing the density of the fluid and the specific heat capacity of the fluid, and/or the specific fluid enthalpy, based on measurements and/or historical data; and to calculate an estimated efficiency for the pump and an estimated flow rate of the fluid based on the measured electrical power, the measured temperatures the measured pressures, the known cross-sectional area, the value for density and the value for specific heat capacity or the value for specific fluid enthalpy.

The computer programme product may include an algorithm that is intended to run in various environments such as a process control system, on a dedicated computer system, or in combination with other production related software.

The invention further provides an apparatus for estimating flow rate of fluid at a pump, the apparatus comprising a data processing device arranged to receive measurements of pressure and temperature of fluid at an intake to a pump, pressure and temperature of the fluid at a discharge from the pump, and electrical power supplied to the pump; to receive or to determine values representing the density of the fluid and the specific heat capacity of the fluid and/or the specific fluid enthalpy based on measurements and/or historical data; and to calculate an estimated efficiency for the pump and an estimated flow rate of the fluid based on the measured electrical power, the measured temperatures the measured pressures, the known cross-sectional area, the value for density and the value for specific heat capacity or the value for specific fluid enthalpy. The data processing device may be arranged to carry out any or all of the method steps described above.

The apparatus may be a control apparatus for the pump and/or for an installation including the pump. For example the apparatus may be a control apparatus for an oil and gas installation and the pump may be for pumping fluids from the oil and gas installation, such as multiphase fluids. The apparatus may include the pump, which may be a centrifugal pump. The pump may be an ESP.

BRIEF DESCRIPTION OF THE DRAWINGS

Certain preferred embodiments of the invention will now be described by way of example only and with reference to the accompanying drawings in which.

DETAILED DESCRIPTION OF PREFERRED EMBODIMENTS

Figure 1:
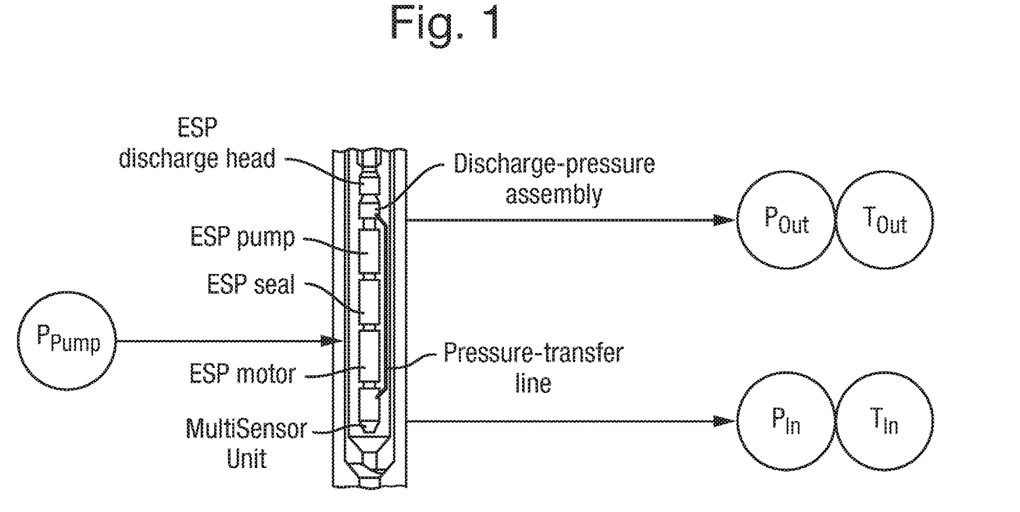
FIG. 1 shows an ESP with motor and pump inside the well.

The estimation of flow rate through a pump will be described below with reference to an Electrical Submersible Pump (ESP) as an example. The ESP is a centrifugal pump which is installed inside the well with the electrical motor as shown in FIG. 1. The motor and the pump convert electric power to heat and mechanical energy for the pumped fluid. The example calculations relate firstly to an incompressible fluid, for example an oil and water mixture, and secondly to a compressible fluid, for example an oil, water and gas mixture.

The pump supplied power, $P_{Pump}$, will be converted to mechanical energy, $P_{Fluid}$, or heat, $Q_{Fluid}$, in the pumped fluid. It is assumed that the fluid mass inside the pump is constant, and there is no loss of either mass (no leak out of the well) or heat from the system (fluid is heated). $\zeta$ is specific enthalpy. Applying mass and energy balances will give:

$$w = w_{In} = w_{Out} \approx q_{In}\beta_{MixIn} \approx q_{Out}\beta_{MixOut} \tag{1}$$

$$P_{Pump} = w(\zeta_{Out}^0 - \zeta_{In}^0) + \Delta Q_{Loss} = \Delta P_{Fluid,Mecanical} + \Delta Q_{Fluid,Heat} + \Delta Q_{Loss} \tag{2}$$

The stagnation enthalpy, $\zeta^0$, and the specific enthalpy, $\zeta$, as expressed as set out below.

$$\zeta^0 = \zeta + \tfrac{1}{2}v^2 + gh$$

$$\zeta = u + pv$$

where v is the fluid velocity, g is specific gravitation, h is the height, u is internal energy, and p is pressure.

For downhole pumps both the motor and the pump is placed in the flowing pipe, thus the heat loss from the pumping system can be neglected since this heat is transferred to the fluid and the temperature on the discharge is measured. Then equation (2) can be written:

$$P_{Pump} = W(\zeta_{Out} - \zeta_{In}) = \Delta P_{Fluid,Mecanical} + \Delta Q_{Fluid,Heat} \tag{2a}$$

Based on the equations (1) and (2a) the mass flow rate can be determined using specific fluid enthalpy obtain by estimation or measurement of the fluid in accordance with equations (44) to (47) below. Alternatively, using density and specific heat capacity then following model may be derived to determine the mass flow rate, w:

$$w_{total} = f(P_{Pump}, p_{In}, p_{Out}, T_{In}, T_{Out}, \rho_{MixIn}, \rho_{MixOut}, c_{P\_MixIn}, c_{P\_MixOut}, A) \tag{3}$$

$$P_{Pump} = \dot{m}gh_{Out} - \dot{m}gh_{In} + \tfrac{1}{2}(\dot{m}v_{Out}^2 - \dot{m}v_{In}^2) + c_{P\_MixOut}\dot{m}T_{Out} - c_{P\_MixIn}\dot{m}T_{In} \tag{4}$$

$$P_{Pump} = w\left(gh_{Out} - gh_{In} + \tfrac{1}{2}(v_{Out}^2 - v_{In}^2) + c_{P\_MixOut}T_{Out} + c_{P\_MixIn}T_{In}\right) \tag{5}$$

$$p_2 = p_1 + \rho g(h_2 - h_1) \tag{6}$$

$$gh_2 - gh_1 = \frac{p_2 - p_1}{\rho} \tag{7}$$

$$w = \dot{m} = \rho q = \rho A v \tag{8}$$

$$P_{Pump} = w\left(\frac{p_{Out}}{\rho_{MixOut}} - \frac{p_{In}}{\rho_{MixIn}} + c_{P\_MixOut}T_{Out} - c_{P\_MixIn}T_{In}\right) + \frac{w^3}{2}\left(\frac{1}{\rho_{MixOut}^2 A_{Out}^2} - \frac{1}{\rho_{MixIn}^2 A_{In}^2}\right) \tag{9}$$

The electric power, $P_{Pump}$, to the pump (or the motor) can be measured or calculated from the voltage and current:

$$P_{Pump} = \Phi U_{Motor} I_{Motor} = \Phi(U_{Motor} - R_{Cable} I_{Motor}) \tag{10}$$

$$\Phi = PF\sqrt{3} \sin(Q_{U\angle I}) \tag{11}$$

If the pumped fluid is incompressible, the fluid density at the intake and the discharge will be equal. If it is assumed that the flowing areas are equal as well, the equation can be simplified as:

$$P_{Pump} = w\left(\frac{p_{Out} - p_{In}}{\rho} + c_{P\_MixOut}T_{Out} - c_{P\_MixIn}T_{In}\right) \tag{12}$$

If the specific heat capacity is the same at the inlet and outlet as well, the equation can be expressed:

$$P_{Pump} = w\left(\frac{p_{Out} - p_{In}}{\rho} + c_P(T_{Out} - T_{In})\right) \tag{13}$$

Now the mass flow rate, w, or the volume flow rate, q, can be determined:

$$w = \frac{\rho P_{Pump}}{p_{Out} - p_{In} + c_P \rho(T_{Out} - T_{In})} = \frac{\eta \cdot \rho P_{Pump}}{p_{Out} - p_{In}} \tag{14}$$

$$q = \frac{P_{Pump}}{p_{Out} - p_{In} + c_P \rho(T_{Out} - T_{In})} = \frac{\eta P_{Pump}}{p_{Out} - p_{In}} \tag{15}$$

Figure 2:
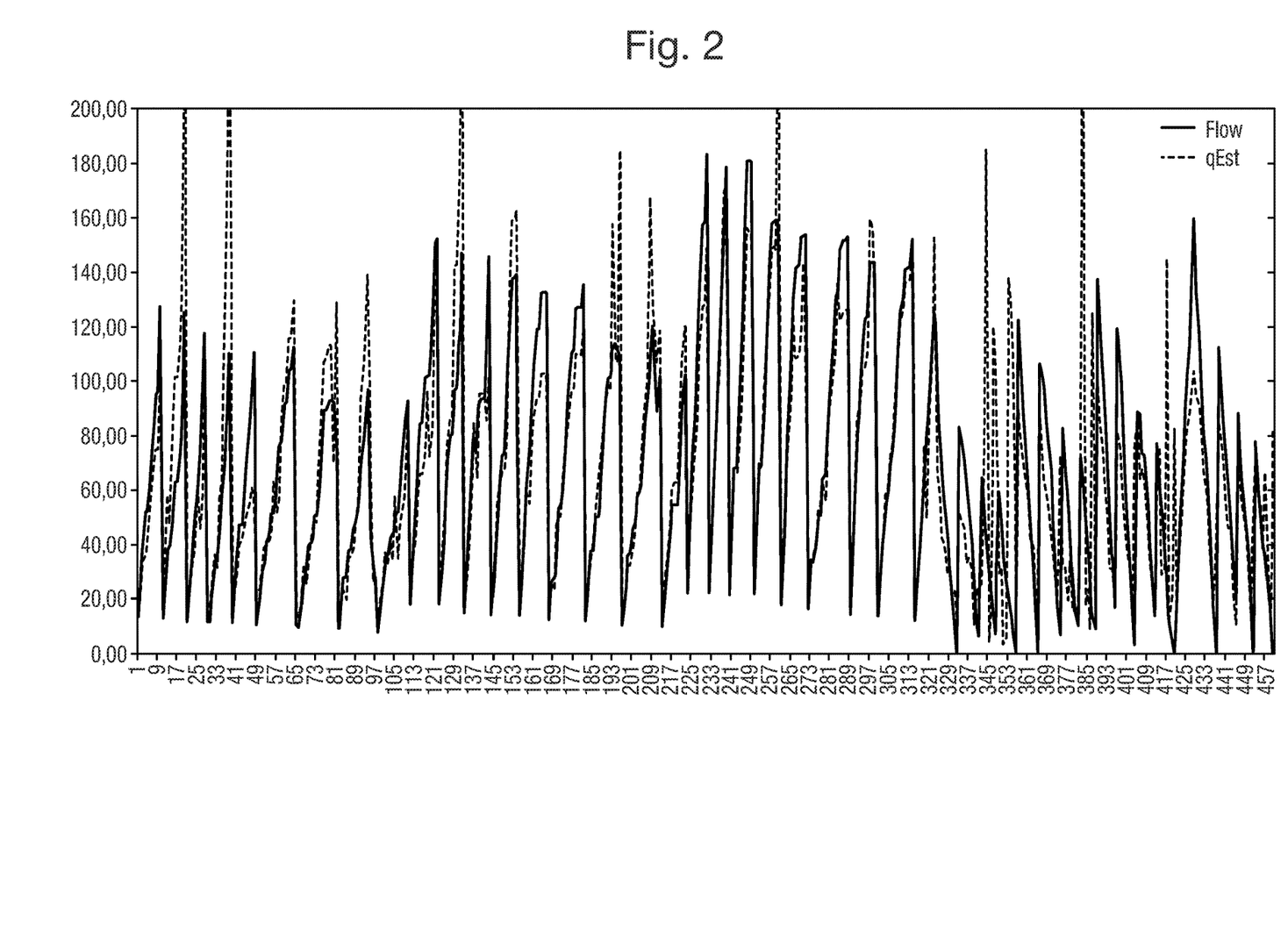
FIG. 2 is a plot showing measured flow rate from an ESP test—solid line—and the flow rate estimated with the model in equation (15)—dashed line.

FIG. 2 shows the results of an example calculation using equation (15). A Centrilift™ ESP was tested with all relevant input and output parameters being measured, and the flow rates also being measured. The specific heat capacity was $c_P = 1800$, and the remaining variables were measured in the flow loop of the test rig. FIG. 2 illustrates the measured flow rate as compared to the flow rate estimated using equation (15). It will be appreciated that there is a close correspondence between the two flow rates, especially during steady state/stable flow conditions.

The pump efficiency, $\eta$, may be expressed as the pump power turned into mechanical fluid energy:

$$\eta = \frac{w(p_{Out} - p_{In})}{\rho P_{Motor}} = \frac{q(p_{Out} - p_{In})}{P_{Motor}} \tag{16}$$

Figure 3:
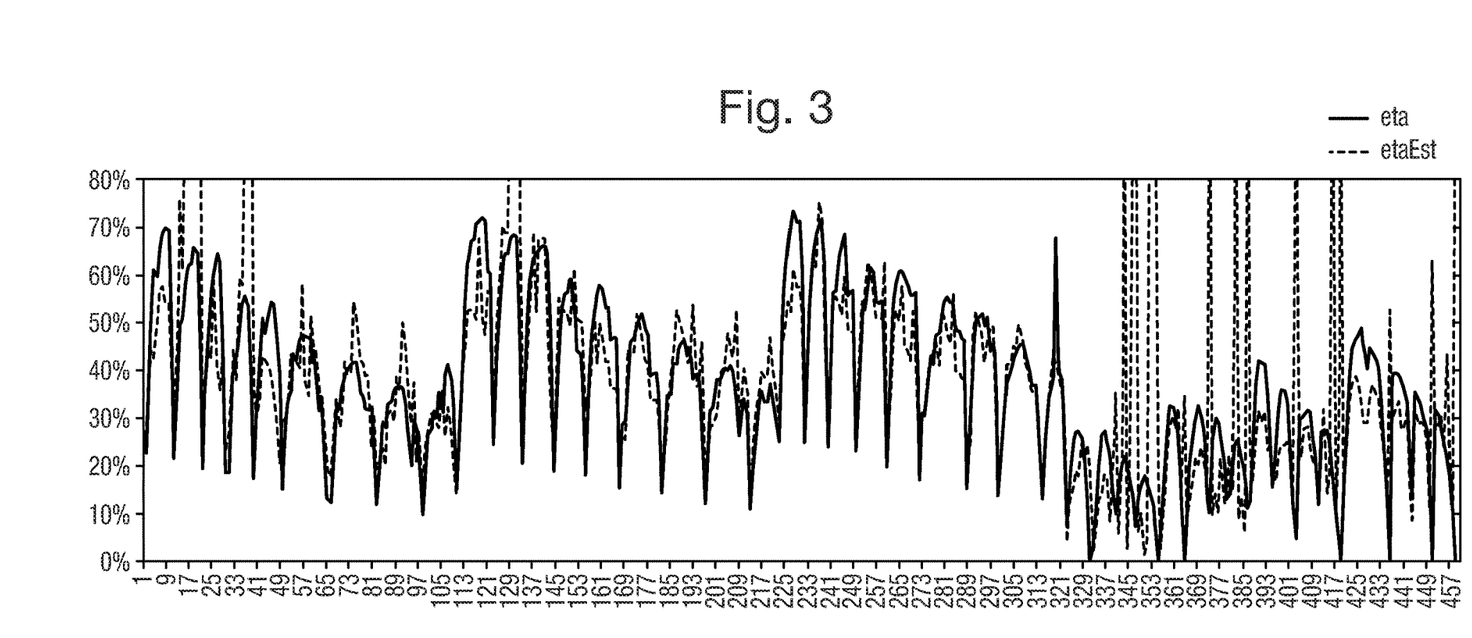
FIG. 3 is a plot showing measured efficiency from the ESP test—solid line—and efficiency estimated with the model in equation (16)—dashed line.

FIG. 3 shows the results of an example calculation using equation (16). The same Centrilift™ ESP test was used as for FIG. 2. FIG. 3 illustrates the measured efficiency as compared to the efficiency estimated using equation (16). It will be appreciated that there is a close correspondence between the two efficiency values, especially during steady state/stable flow conditions.

Alternatively, from the fluid temperature increase:

$$\eta = \frac{P_{Motor} - wc_P(T_{Out} - T_{In})}{P_{Motor}} \tag{17}$$

Combining the equations (16) and (17) enables direct calculation of the pump efficiency independent of the applied break horse power, $P_{Pump}$ via equation (18) The pump efficiency should be verified to be in the pump range (as specified by the manufacturer) and only valid if $T_{Out} > T_{In} + \Delta T_{min}$ and $p_{Out} > p_{In} + \Delta p_{Min}$ before applied for flow rate estimation according to equation (14) or (15). If the pump efficiency from the calculation is outside of the range from the manufacturer then an alert is made regarding potentially bad measurements or some other outside influence leading to bad results, such as an unstable flow during the measurement period.

$$\eta = \frac{1}{1 + c_P \rho \frac{T_{Out} - T_{In}}{p_{Out} - p_{In}}} \quad (18)$$

Figure 4:
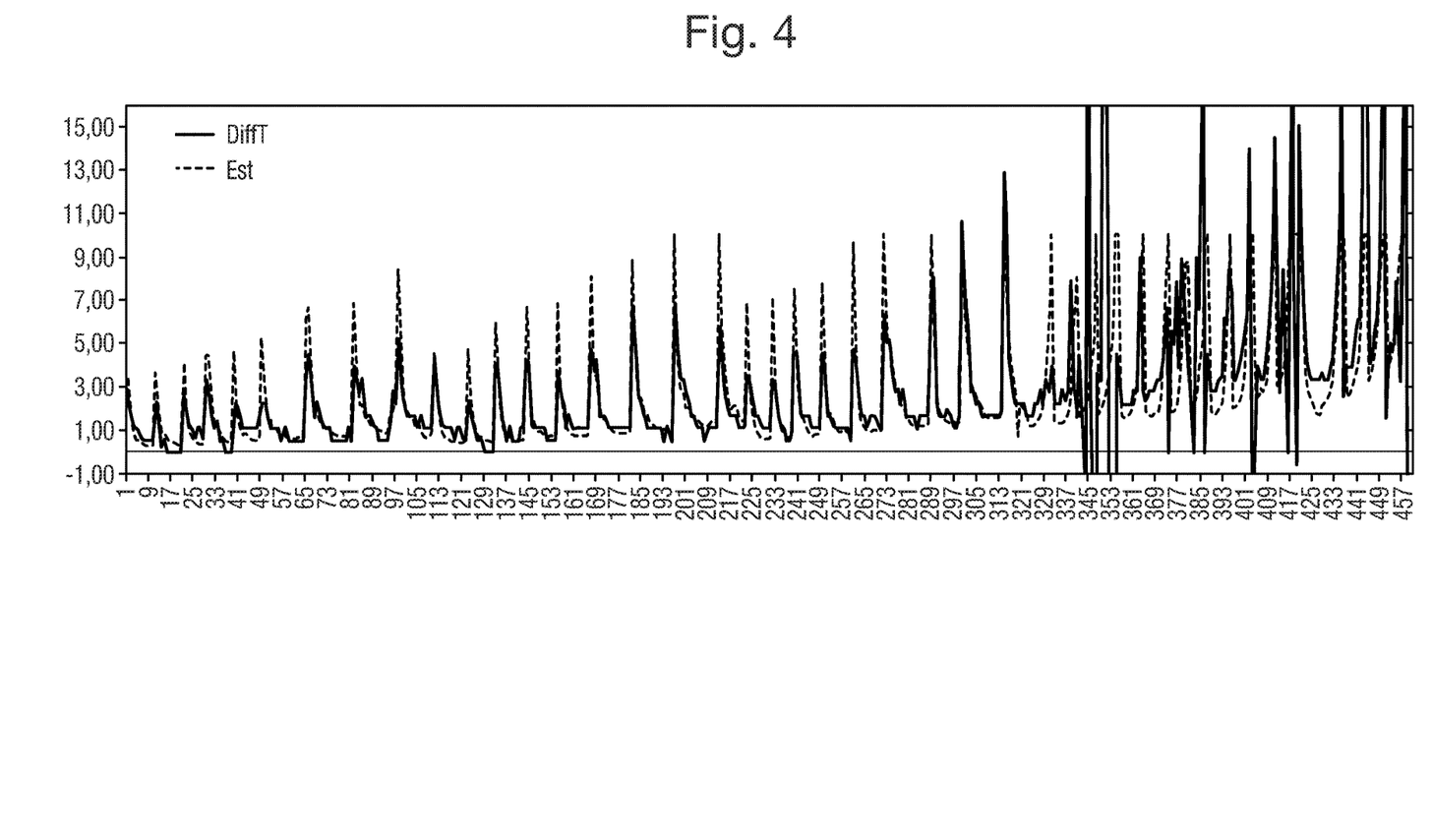
FIG. 4 shows the recorded temperature increase from the ESP test—solid line—and the same values estimated with the model in equation (15)—dashed line—when the measured flow rate was used as an input for the mode.

Both the estimated flow rate (FIG. 2) pump efficiency (FIG. 3) deviate from the flow loop measurements. The main uncertainty of the input data is the measured temperature change. To evaluate this input variable, the model has been used to calculate the temperature increase and compare with the flow loop measurement. The measured and estimated temperature changes (to achieve the flow loop measured flow rate) are shown in FIG. 4.

If the pumped fluid is compressible, the calculations are more complex as indicated in equation (19). Since this model is a $3^{rd}$ order equation, a non-linear method (e.g. Newton Raphson) may be used to solve the equation. If we assume that the cross sectional areas at intake and discharge are equal, the equation can be written:

$$P_{Pump} = w\left(\frac{p_{Out}}{\rho_{MixOut}} - \frac{p_{In}}{\rho_{MixIn}} + c_{P\_MixOut}T_{Out} - c_{P\_MixIn}T_{In}\right) + \frac{w^3}{2A^2}\left(\frac{1}{\rho_{MixOut}^2} - \frac{1}{\rho_{MixIn}^2}\right) \quad (19)$$

The next assumptions are that the phase mass fractions, $x_i$, and fluid (phase) properties are known and that there is no slip between the phases. The following relations for mixed heat capacity and density may be established:

$$c_{P\_Mix} = \sum_{i=1}^{N}[x_i(p, T) \cdot c_{P\_i}(p, T)] \quad (20)$$

$$\rho_{Mix} = \left[\sum_{i=1}^{N}\frac{x_i(p, T)}{\rho_i(p, T)}\right]^{-1} \quad (21)$$

The flow rate may be formulated as $3^{rd}$ order equation:

$$w^3 + w\frac{2A^2}{\frac{1}{\rho_{MixOut}^2} - \frac{1}{\rho_{MixIn}^2}}\left(\frac{p_{Out}}{\rho_{MixOut}} - \frac{p_{In}}{\rho_{MixIn}} + c_{P\_MixOut}T_{Out} - c_{P\_MixIn}T_{In}\right) = \frac{2A^2}{\frac{1}{\rho_{MixOut}^2} - \frac{1}{\rho_{MixIn}^2}}P_{Pump} \quad (22)$$

$$w^3 + w \cdot c_1(A, \rho_{MixIn}, \rho_{MixOut}, c_{P\_MixIn}, c_{P\_MixOut}, p_{In}, p_{Out}, T_{In}, T_{Out}) + c_0(A, \rho_{MixIn}, \rho_{MixOut}, P_{Pump}) = 0 \quad (23)$$

The efficiency of the pump may be expressed as the fraction of the applied power that is transformed into mechanical energy, similar to equation (16), but the fluid compressibility should be accounted for:

$$P_{Pump}\eta = w\left(\frac{p_{Out}}{\rho_{MixOut}} - \frac{p_{In}}{\rho_{MixIn}}\right) + \frac{w^3}{2A^2}\left(\frac{1}{\rho_{MixOut}^2} - \frac{1}{\rho_{MixIn}^2}\right) \quad (24)$$

$$P_{Pump}(1-\eta) = w(c_{P\_MixOut}T_{Out} - c_{P\_MixIn}T_{In}) \quad (25)$$

$$\eta = \frac{1-\eta}{c_{P\_MixOut}T_{Out} - c_{P\_MixIn}T_{In}}\left(\frac{p_{Out}}{\rho_{MixOut}} - \frac{p_{In}}{\rho_{MixIn}}\right) + \frac{P_{Pump}^2(1-\eta)^3}{2A^2(c_{P\_MixOut}T_{Out} - c_{P\_MixIn}T_{In})^3}\left(\frac{1}{\rho_{MixOut}^2} - \frac{1}{\rho_{MixIn}^2}\right) \quad (26)$$

Equation (26) can be reformulated in the efficiency, $\eta$, as a $3^{rd}$ order formula:

$$\eta^3 - 3\eta^2 + (3 + b_1 + b_2)\eta + (b_1 - 1) = 0 \quad (27)$$

$$b_1 = \frac{2A^2(c_{P\_MixOut}T_{Out} - c_{P\_MixIn}T_{In})^2}{P_{Pump}^2}\left(\frac{p_{Out}}{\rho_{MixOut}} - \frac{p_{In}}{\rho_{MixIn}}\right)\left(\frac{1}{\rho_{MixOut}^2} - \frac{1}{\rho_{MixIn}^2}\right)^{-1} \quad (28)$$

$$b_2 = \frac{2A^2(c_{P\_MixOut}T_{Out} - c_{P\_MixIn}T_{In})^2}{P_{Pump}^2}\left(\frac{1}{\rho_{MixOut}^2} - \frac{1}{\rho_{MixIn}^2}\right)^{-1} \quad (29)$$

The models in equations (23) and (27) are non-linear and the solution may be found using the Newton-Raphson method. Then the derivate of the function will be used:

$$f_w^1(w) = 3w^2 + c_1$$
$$(A, \rho_{MixIn}, \rho_{MixOut}, c_{P\_MixIn}, c_{P\_MixOut}, p_{In}, p_{Out}, T_{In}, T_{Out}) \quad (30)$$

$$f_\eta^1(\eta) = 3\eta^2 - 6\eta + (3 + b_1 + b_2) \quad (31)$$

The solution of the variable is now found by iterations on x (which is w or $\eta$ in the equations above):

$$x_{i+1} = x_i - \frac{f_x(x_i)}{f_x^1(x_i)} \quad (32)$$

Figure 5:
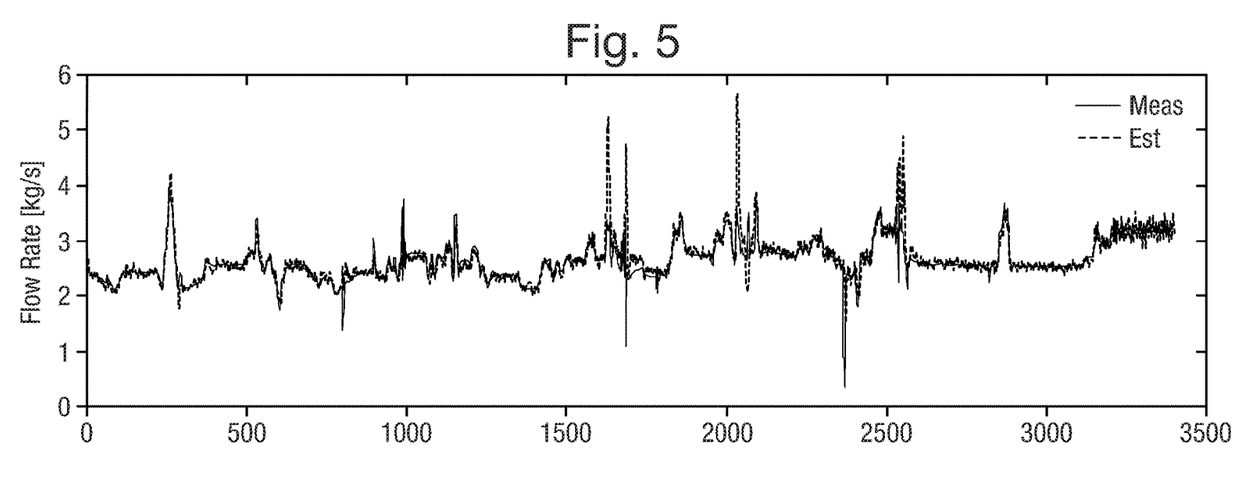
FIG. 5 shows a plot of flow rate from a flow loop for an ESP test—blue line—and the flow rate estimated with the model in equation (23)—red line.

FIG. 5 shows an example calculation using equation (23). A Centrilift™ ESP was tested with all relevant input and output parameters being measured, and the flow rates also being measured. The specific heat capacity was $c_P$=1750, and the remaining variables were measured in the flow loop. FIG. 5 illustrates the measured flow rate as compared to the flow rate estimated using equation (23). It will be appreciated that there is a close correspondence between the two flow rates, especially during steady state/stable flow conditions.

Figure 6:
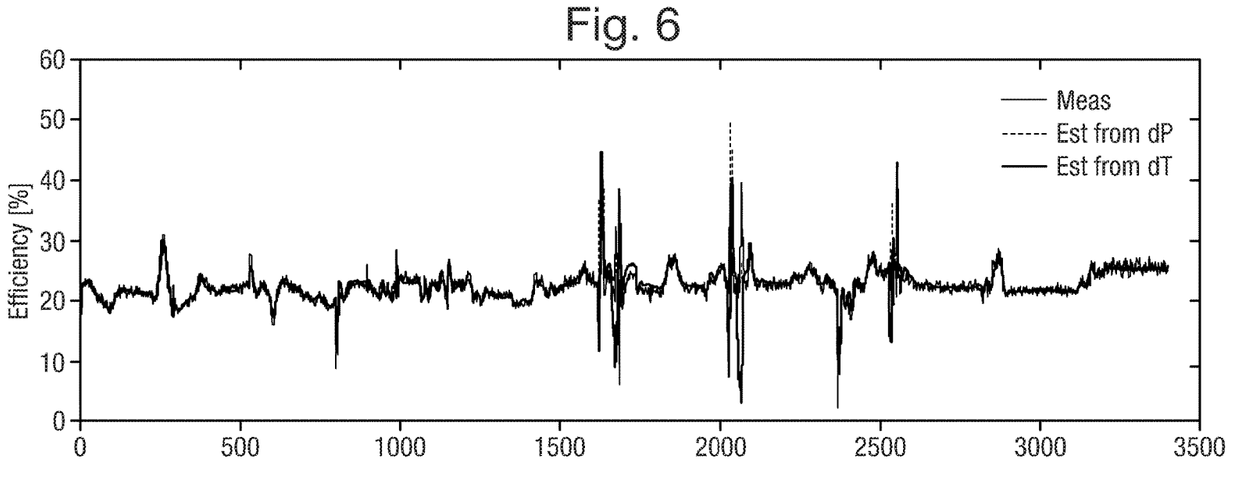
FIG. 6 is a plot of efficiency from the flow loop—solid line—and the efficiency estimated with equation (26)—dashed line and equation (27)—bold line.

FIG. 6 shows data from the same test in relation to efficiency. The measured values for efficiency are plotted along with calculated values from equations (26) and (27) based on pressure and temperature differentials respectively.

Figure 7:
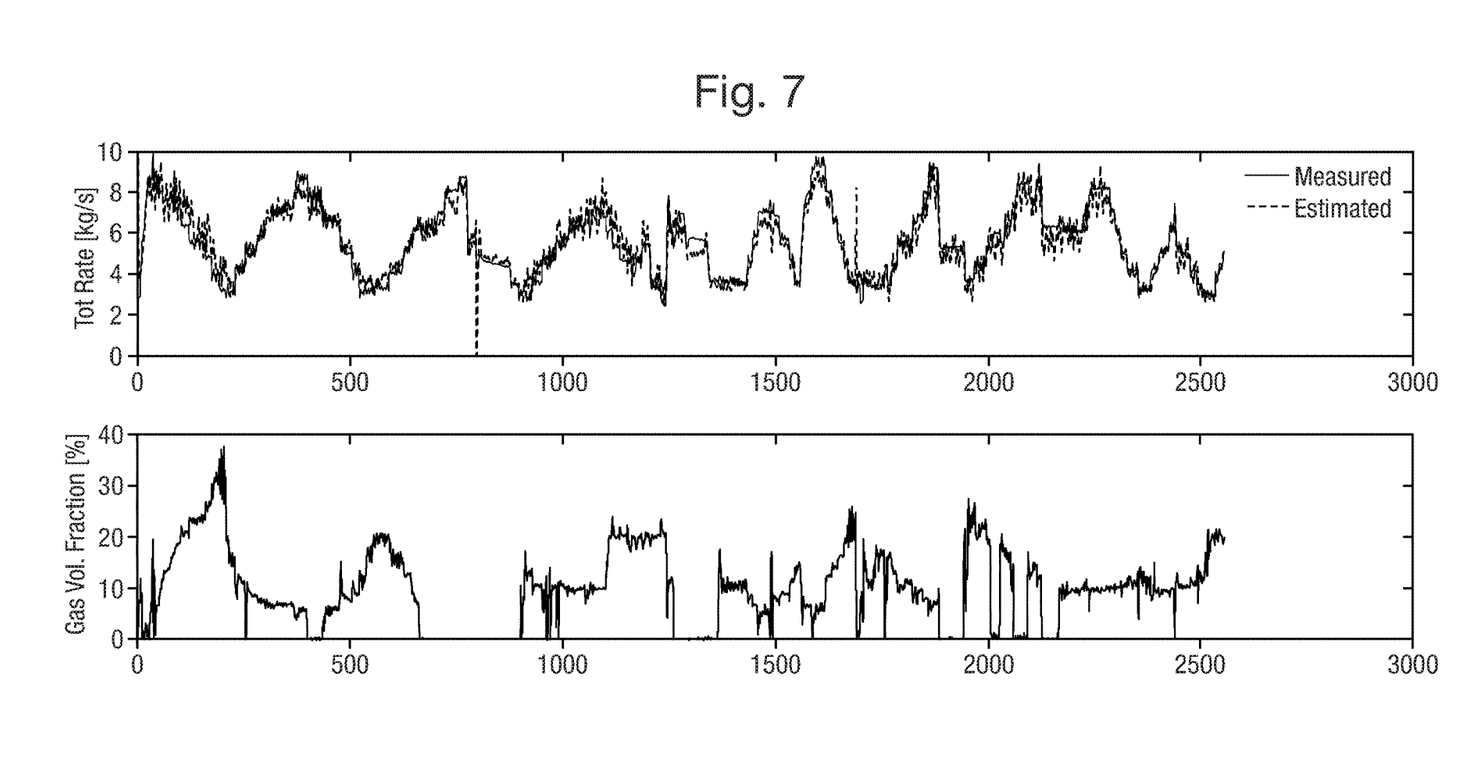
FIG. 7 shows, in the top plot, the flow rate obtained from a flow loop for an ESP test—solid line—and the flow rate estimated with the multiphase model as shown in equation (23)—dashed line, and, in the bottom plot, the gas volume fraction.

FIG. 7 illustrates, in the top plot, a comparison of flow rates from the flow loop for an ESP test and flow rates calculated using equation (23), with the bottom plot showing the gas volume fraction (GVF). It will be appreciated that the large variations in GVF result in substantial variations in compressibility of the fluid through the pump. Nonetheless, the estimated flow rates from equation (23) follow the measured values closely.

The pump curves and the viscosity correction factors may be used to find the fluid viscosity as shown in equation (38).

$$\mu_0 = \mu_{Estimate} \tag{33}$$

$$VCF_Q = f(\mu_{Estimate}, f) \tag{34}$$

$$w_{base} = w_{Estimate}\left(\frac{f_0}{f}\right)\frac{1}{VCF_Q}\left(\frac{\rho_{water}}{\rho_{Mix}}\right) \tag{35}$$

$$\eta_{base} = f_{LUT}(w_0, \eta_0, w_{base}) \tag{36}$$

$$VCF_\eta = \frac{\eta_{Estimate}}{\eta_{base}} \tag{37}$$

$$\mu_{Estimate} = (f(VCF_\eta, f)) \tag{38}$$

Figure 8:
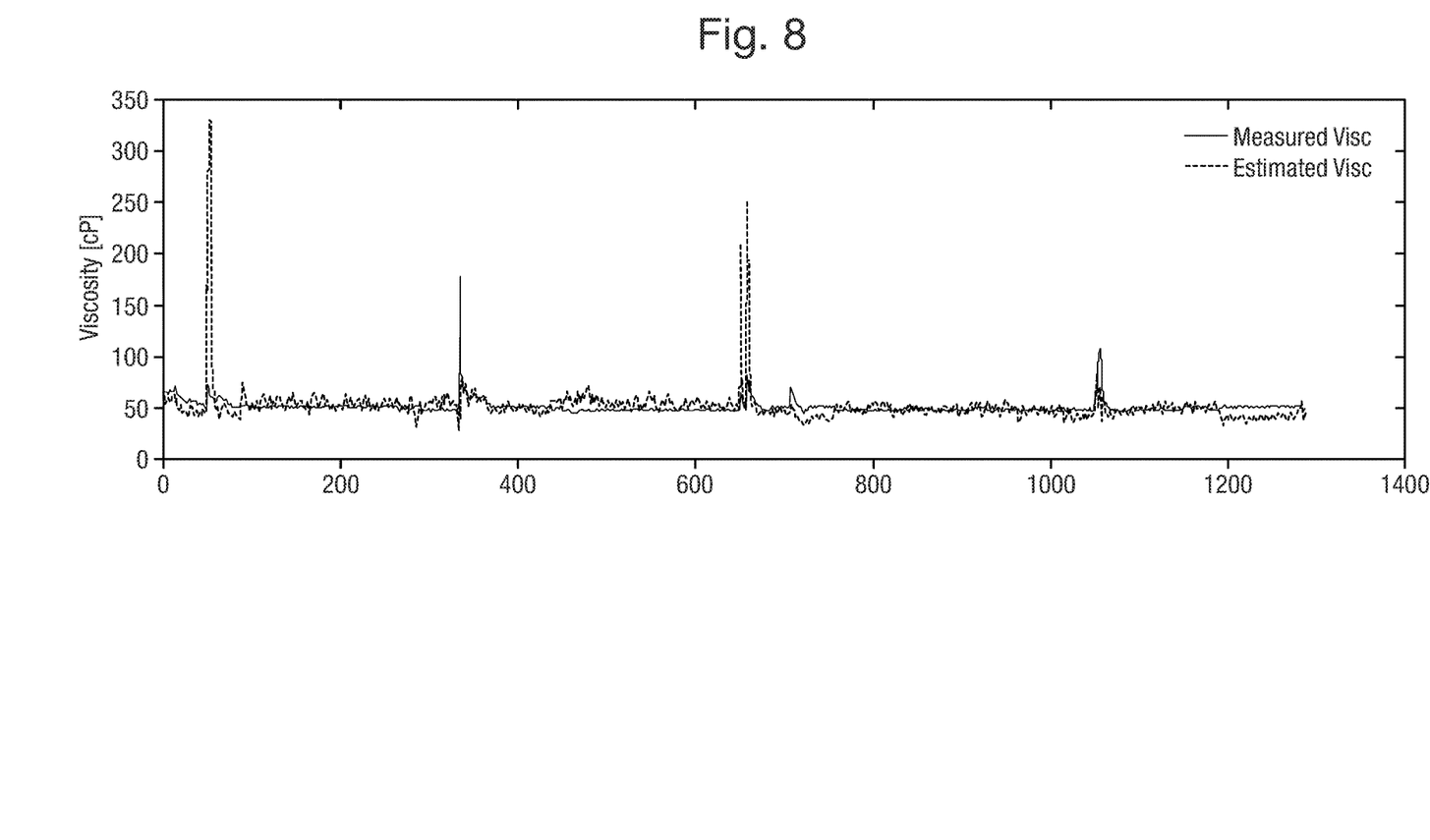
FIG. 8 shows viscosity obtained from the flow loop—solid line—and viscosity estimated with the multiphase model—dashed line.

While the absolute difference between the estimated viscosity and the estimated viscosity at the previous iteration is greater than a defined tolerance ε, iterate on equations (33)—(38) to estimate the viscosity. Equation (33) saves the viscosity estimated at the previous step to be compared with the estimated viscosity of the current step. Initially, this can be set to an initial guess value defined by the user. Viscosity correction factor for flow is computed for this viscosity (34) The estimated flow rate $w_{Estimate}$ from (14) is converted to reference base case (water, 60 Hz) using viscosity correction factor and affinity laws (35). The base efficiency $\eta_{base}$ is then computed from the reference base curve implemented in the form of a lookup table (36). Using the base efficiency and the estimated efficiency $\eta_{Estimate}$ from (16), (17) or (18), the viscosity correction factor for efficiency is computed (37). The viscosity is then estimated from the VCF function for efficiency (38). This is then iterated until the change in the viscosity is less than a defined tolerance value. FIG. 8 shows the viscosity as measured from the flow loop for the ESP test compared against the calculated viscosity using the model described above.

Figure 9:
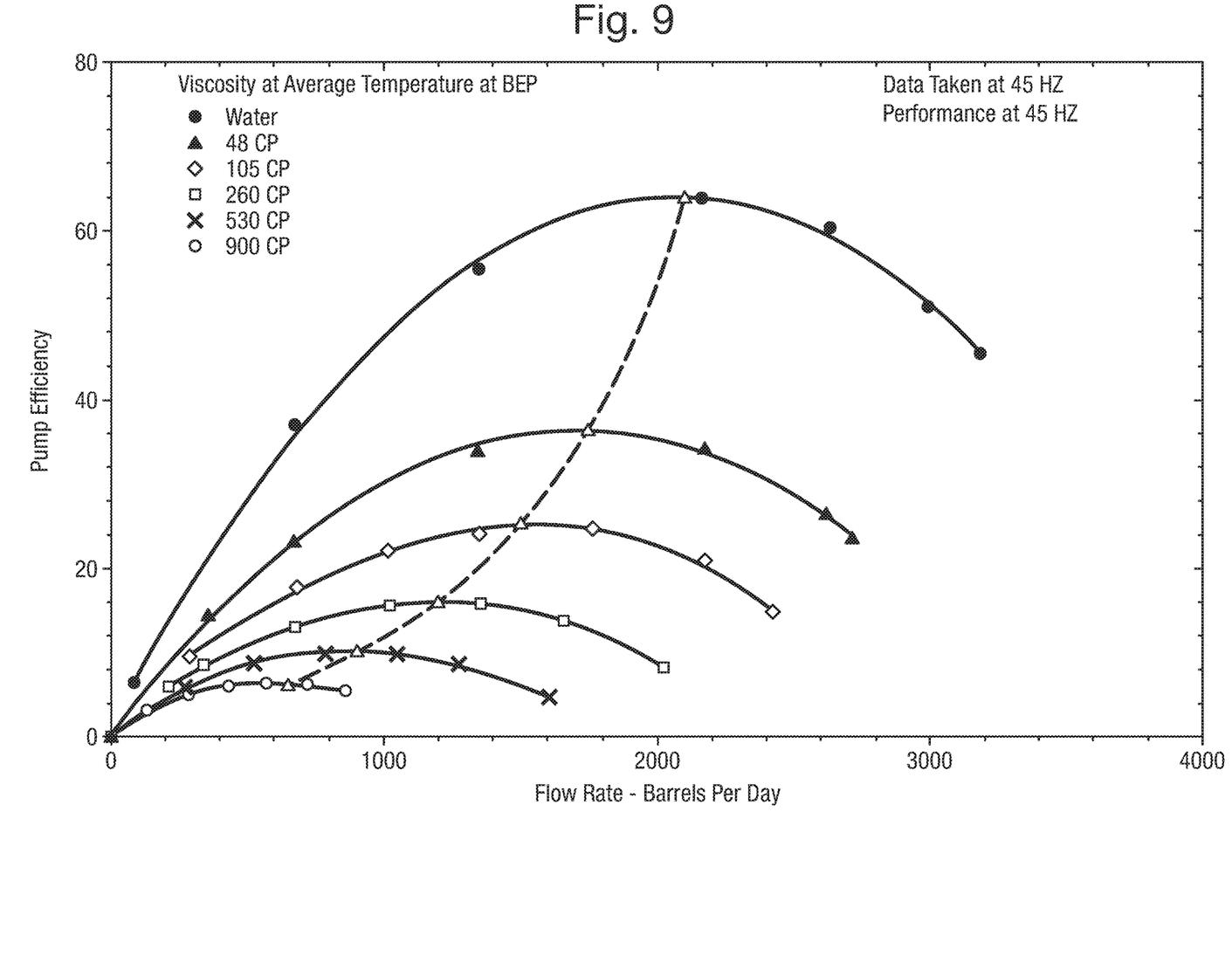
FIG. 9 is an example of ESP efficiency curves for various fluid viscosities.

It is also possible to determine the fluid viscosity from efficiency, flow rate, mass flow rate, pump frequency, and pump specific calibration data/efficiency curves if this is available. An example of such curves is shown in FIG. 9. When the flow rate and efficiency is known then viscosity can be read from the graph. As well as this, other pump specific relationships like Dp vs flow, or power vs flow may be used.

For Multiphase flow through the ESP, the GVF can be estimated using the Gas correction factor GCF and the estimated efficiency from (16), (17) or (18). When gas enters the ESP, the performance of the pump is affected and this can be observed in the differential pressure and the brake horsepower (BHP) of the pump. To account for the effect to gas in the system, the co-called Gas correction factors are modelled for dp and BHP. The GCF for dp and BHP are primarily a function of the gas fraction or the GVF and are modelled using experimental data. Estimation of the GVF using the GCF can be done using the equations below.

$$VCF_Q = f(\mu_{Estimate}, f) \tag{39}$$

$$w_{base} = w_{Estimate}\left(\frac{f_0}{f}\right)\frac{1}{VCF_Q}\left(\frac{\rho_{water}}{\rho_{Mix}}\right) \tag{40}$$

$$\eta_{base} = f_{LUT}(w_0, \eta_0, w_{base}) \tag{41}$$

$$GCF_\eta = \frac{\eta_{Estimate}}{\eta_{base}} \tag{42}$$

$$x_G = f(GFC_\eta) \tag{43}$$

As noted above, specific fluid enthalpy values can be determined as an alternative to using density and specific heat capacity. In this case, starting with equations (1) and (2a) above, then the equations below can be used to find the efficiency and hence the flow rate. The fluid enthalpy can be found from fluid data bases, and thus calculated based on the actual pressure and temperature $$w = \frac{\varsigma_{Out}(p_{Out}, T_{Out}) - \varsigma_{In}(p_{In}, T_{In})}{P_{Pump}} \tag{44}$$

$$\varsigma_{Pos} = \sum_{i=1}^{N} x_i \varsigma_{i,Pos}(p_{Pos}, T_{Pos}) \tag{45}$$

where $x_i$ is the mass fraction of phase no i.

Further the efficiency $\eta_i$ may be found from the enthalpy directly as:

$$\eta = \frac{\varsigma_{Out}(p_{Out}, T_{In}) - \varsigma_{In}(p_{In}, T_{In})}{\varsigma_{Out}(p_{Out}, T_{Out}) - \varsigma_{In}(p_{In}, T_{In})} = \frac{\Delta\varsigma(\Delta p, T_{In})}{\Delta\varsigma(\Delta p, \Delta T)} \tag{46}$$

The enthalpy function may be defined as a polynomial function in p and T:

$$\varsigma_i = a_0 + a_p p + a_T T + a_{pT} pT + \ldots + a_{M_p NT} p^M T^n \tag{47}$$

By way of a summary a review of an example process is set out below. To ensure robust and accurate flow rate calculations some precautions are necessary as explained above. First, the input measurements $P_{Pump}$, $p_{In}$, $T_{In}$, $p_{Out}$, $T_{Out}$ are obtained. Then these values are checked to ensure that they are suitable, for example by checking that the last value is in line with the measurements during a given preceding period (e.g. not deviate more than a given value from the average value during the last 5 minutes). This ensures that the measurements are stable. It is also possible to adjust for dynamic effects by predicting the measurement(s) based on the input data. An estimator such as a Kalman filter could be used in this case. If the measurements are not suitable then in some cases they might be corrected using a model or the like. Alternatively the process may require a waiting period of the type discussed above to allow for a steady stable state to be achieved.

If the measurements are suitable then the appropriate parts of the above model are utilised to calculate the pump efficiency will be determined. The calculated efficiency should be verified, and if it is in line with manufacturer data then it is accepted. If the efficiency is outside the range, then an alert is made to indicate that something is wrong either with the:

1. Measured input data (operator should check),
2. Pump (wear, tear, failure) which should be notified, or
3. Applied fluid properties (fluid model update may be required)

If desired and the pump specific parameters are available then the fluid viscosity may be directly determined.

In the above analysis since the ESP used as an example has the motor and the pump submerged in the fluid the heat loss can be ignored. The proposed technique can be adapted for any pump or compressor where the applied electric power is measured or can be determined. The same model can be used to find the flow rate provided that the heat loss, $Q_{Loss}$, is compensated for. This may be done with a simple model:

$$Q_{Loss} \approx H_A(T_{Out} - T_{Env}) \tag{48}$$

The heat transfer coefficient, $H_A$, may be adapted or determined from the equipment size and location. The environment temperature, $T_{Env}$, should also be measured for this situation.

Thus, it will be appreciated that the proposed estimation of flow rate provides accurate results, as evidenced by the comparisons in the Figures, and furthermore that there are various advantages compared to known systems as in US 2013/317762 and US 2015/211906. The fluid viscosity is not required to be measured or estimated, which simplifies the calculations significantly and also allows for a greater range of fluids to be the basis for the calculations, including for example heavy oils. The compressibility (i.e. gas fraction) will not significantly affect the accuracy of the results, which means that the estimation technique provides important advantages in relation to multiphase flow, such as pumping of oil and gas mixtures. In addition, it is not necessary to test the pump with varying fluid viscosity for calibration purposes in order to obtain accurate flow rate estimates, although if suitable calibration data is available then this can advantageously be used to determine the fluid viscosity.

The invention claimed is:

1. A method for determining an estimated mass flow rate of multiphase fluids in the oil and gas industry in a pump system including a pump, the method comprising:
   obtaining measurements of a pressure and a temperature of a multiphase fluid at an intake to the pump, a pressure and a temperature of the multiphase fluid at a discharge from the pump, and power supplied to the pump system;
   determining values representing a specific fluid enthalpy based on measurements and fluid models and/or historical data;
   calculating an estimated efficiency of the pump and an estimated mass flow rate of the multiphase fluid based on the supplied power, the measured temperatures, the measured pressures, and the determined value for specific fluid enthalpy;
   at least one of
      using pump specific efficiency vs mass flow rate curves plotted for varying viscosities of multiphase fluids, determined using calibration data for the pump, to determine a viscosity for the multiphase fluid by determining a viscosity curve with which the estimated flow rate and the estimated pump efficiency correspond,
      using pump power vs mass flow rate curves plotted for varying viscosities of multiphase fluids, determined using calibration data for the pump, to determine a viscosity for the multiphase fluid by determining a viscosity curve with which the estimated flow rate and the estimated pump power correspond, and
      obtaining a differential pressure of the pump, and using pump specific differential pressure vs mass flow rate curves plotted for varying viscosities of multiphase fluids, determined using calibration data for the pump, to determine a viscosity for the multiphase fluid by determining a viscosity curve with which the estimated flow rate and the estimated pump differential pressure correspond; and
   comparing the calculated estimated efficiency of the pump to a manufacturer's prescribed efficiency values of the pump, and when the calculated estimated efficiency of the pump is outside of the manufacturer's prescribed efficiency values, issuing an alert which indicates at least one of an error in measured input data, wear on the pump, damage to the pump, or failure of the pump.

2. The method as claimed in claim 1, wherein the multiphase fluid passing through the pump is sampled or collected downstream of the pump, with measurements being taken to determine values for the specific enthalpy.

3. The method as claimed in claim 1, wherein estimated values for the specific fluid enthalpy are used, with the estimated values being derived from fluid property models and from the pressures and temperatures that are measured at the pump intake and discharge.

4. The method as claimed in claim 1, further comprising modifying a pump device in order that it includes temperature and pressure sensors for the intake and the discharge.

5. The method as claimed in claim 1, further comprising determining if a stable flow condition exists before using measured temperature and pressure values in the calculating of the estimated efficiency and mass flow rate.

6. The method as claimed in claim 1, further comprising allowing a predetermined time period to elapse after the system is initiated or after an unstable flow condition is known to be present or has been detected.

7. The method as claimed in claim 6, further comprising allowing a predetermined time period to elapse after a change is made to a control of the pump or to other flow control devices affecting the flow at the pump.

8. The method as claimed in claim 6, wherein the predetermined time period is at least 5 minutes.

9. The method as claimed in claim 1, further comprising checking for changes above a certain threshold in one or more of the measured pressures, the measured temperatures, the power supplied to the pump, or the calculated pump efficiency during a predetermined time period before using measured temperature and pressure values in the calculating of the estimated efficiency and mass flow rate.

10. The method as claimed in claim 1, further comprising comparing the discharge and intake temperatures and checking that the discharge temperature is higher than or at least the same as the intake temperature.

11. The method as claimed in claim 1, wherein the calculating of the estimated efficiency for the pump and the estimated mass flow rate is carried out based on an assumption that the power supplied to the pump is converted to mechanical energy and to heat in the pumped fluid, and that there is no loss of either mass or heat.

12. The method as claimed in claim 1, wherein mass and energy balances are used to determine the mass flow rate based on the measured pressure and temperature values, a known cross-sectional area for the pump, and the determined values for specific fluid enthalpy.

13. The method as claimed in claim 1, further comprising using calibration data for the pump to determine a gas fraction in the pump for compressible fluids based on the estimated mass flow rate and the efficiency.

14. The method as claimed in claim 1, wherein the pump is a centrifugal pump.

15. The method as claimed in claim 1, wherein the pump is an electrical submersible pump (ESP).

16. A non-transient computer programme product comprising instructions that, when executed, will configure a data processing device to carry out the method as claimed in claim 1.

17. A non-transient computer programme product comprising instructions that, when executed, will configure a data processing device:
- to receive measurements of pressure and temperature of a multiphase fluid at an intake to a pump, pressure and temperature of the multiphase fluid at a discharge from the pump, and electrical power supplied to the pump;
- to receive or to determine values representing a specific fluid enthalpy, based on measurements and/or historical data;
- to calculate an estimated efficiency for the pump and an estimated mass flow rate of the multiphase fluid based on the measured electrical power, the measured temperatures the measured pressures, a known cross-sectional area, and the value for specific fluid enthalpy;
- at least one of
  - to use pump specific efficiency vs mass flow rate curves plotted for varying viscosities of multiphase fluids, determined using calibration data for the pump to determine a viscosity for the multiphase fluid by determining a viscosity curve with which the estimated flow rate and the estimated pump efficiency correspond,
  - to use pump power vs mass flow rate curves plotted for varying viscosities of multiphase fluids, determined using calibration data for the pump, to determine a viscosity for the multiphase fluid by determining a viscosity curve with which the estimated flow rate and the estimated pump power correspond, and
  - to obtain a differential pressure of the pump, and to use pump specific differential pressure vs mass flow rate curves plotted for varying viscosities of multiphase fluids, determined using calibration data for the pump, to determine a viscosity for the multiphase fluid by determining a viscosity curve with which the estimated flow rate and the estimated pump differential pressure correspond; and
- to compare the calculated estimated efficiency of the pump to a manufacturer's prescribed efficiency values of the pump, and when the calculated estimated efficiency of the pump is outside of the manufacturer's prescribed efficiency values, to issue an alert which indicates at least one of an error in measured input data, wear on the pump, damage to the pump, or failure of the pump.

18. An apparatus for estimating flow rate of multiphase fluids in the oil and gas industry at a pump, the apparatus comprising a data processing device arranged:
- to receive measurements of pressure and temperature of a multiphase fluid at an intake to a pump, pressure and temperature of the multiphase fluid at a discharge from the pump, and electrical power supplied to the pump;
- to receive or to determine values representing a specific fluid enthalpy based on measurements and/or historical data;
- to calculate an estimated efficiency for the pump and an estimated mass flow rate of the multiphase fluid based on the measured electrical power, the measured temperatures the measured pressures, a known cross-sectional area, and the value for specific fluid enthalpy;
- at least one of
  - to use pump specific efficiency vs mass flow rate curves plotted for varying viscosities of multiphase fluids, determined using calibration data for the pump to determine a viscosity for the multiphase fluid by determining a viscosity curve with which the estimated flow rate and the estimated pump efficiency correspond,
  - to use pump power vs mass flow rate curves plotted for varying viscosities of multiphase fluids, determined using calibration data for the pump, to determine a viscosity for the multiphase fluid by determining a viscosity curve with which the estimated flow rate and the estimated pump power correspond, and
  - to obtain a differential pressure of the pump, and to use pump specific differential pressure vs mass flow rate curves plotted for varying viscosities of multiphase fluids, determined using calibration data for the pump, to determine a viscosity for the multiphase fluid by determining a viscosity curve with which the estimated flow rate and the estimated pump differential pressure correspond; and
- to compare the calculated estimated efficiency of the pump to a manufacturer's prescribed efficiency values of the pump, and when the calculated estimated efficiency of the pump is outside of the manufacturer's prescribed efficiency values, to issue an alert which indicates at least one of an error in measured input data, wear on the pump, damage to the pump, or failure of the pump.

19. The apparatus as claimed in claim 18, wherein the data processing device is arranged to carry out a method for determining an estimated mass flow rate of the multiphase fluid in a pump system including the pump, the method comprising:
- obtaining measurements of the pressure and temperature of the multiphase fluid at the intake to the pump, the pressure and temperature of the multiphase fluid at the discharge from the pump, and the power supplied to the pump system;
- determining values representing the specific fluid enthalpy based on measurements and fluid models and/or historical data; and
- calculating the estimated efficiency of the pump and the estimated mass flow rate of the multiphase fluid based on the supplied power, the measured temperatures, the measured pressures, and the determined value for specific fluid enthalpy.

* * * * *